United States Patent
Rayces

[15] 3,700,310
[45] Oct. 24, 1972

[54] COMPACT CATADIOPTRIC APOCHROMAT SYSTEM

[72] Inventor: Juan L. Rayces, Santa Ana, Calif.

[73] Assignee: The Perkins-Elmer Corporation, Norwalk, Conn.

[22] Filed: Sept. 10, 1971

[21] Appl. No.: 179,367

[52] U.S. Cl. .................................................350/201
[51] Int. Cl. ..................................................G02b 17/08
[58] Field of Search......................................350/201

[56] References Cited

UNITED STATES PATENTS 2,378,301  6/1945  Kaprelian..................350/201
3,547,525  12/1970  Rayces et al...........350/201 X

*Primary Examiner*—John K. Corbin
*Attorney*—Edward R. Hyde, Jr.

[57] ABSTRACT

A highly corrected compact optical system which has a large telephoto ratio, and which is particularly adapted for a photographic objective, is provided by a catadioptric system consisting of a solid refractive support which has a portion of smaller diameter projecting from its forward end and internal reflecting surfaces on its opposite end. An annular convergent reflecting surface on the rear end of the support reflects incoming light back through the support to a circular divergent reflecting surface which is on the forward end of the forwardly projecting portion and which reflects the light back through the opening at the center of the annular reflecting surface where a series of lenses are suitably provided for increasing the focal length of the system and correcting for some aberrations. Light enters the system through an afocal doublet at the front of the system consisting of a positive lens in front of a negative lens with an air space between; this doublet has an axial aperture through it and is positioned at the front of the support, around the forwardly projecting portion. The positive lens and the support are both of the same material which has substantially the same dispersive power as the material of the negative lens but a much lower (about 17 percent lower) refractive index, so that apochromatism is achieved with rather shallow spherical surfaces, which avoid zonal spherical aberration and the need for aspheric surfaces.

10 Claims, 1 Drawing Figure

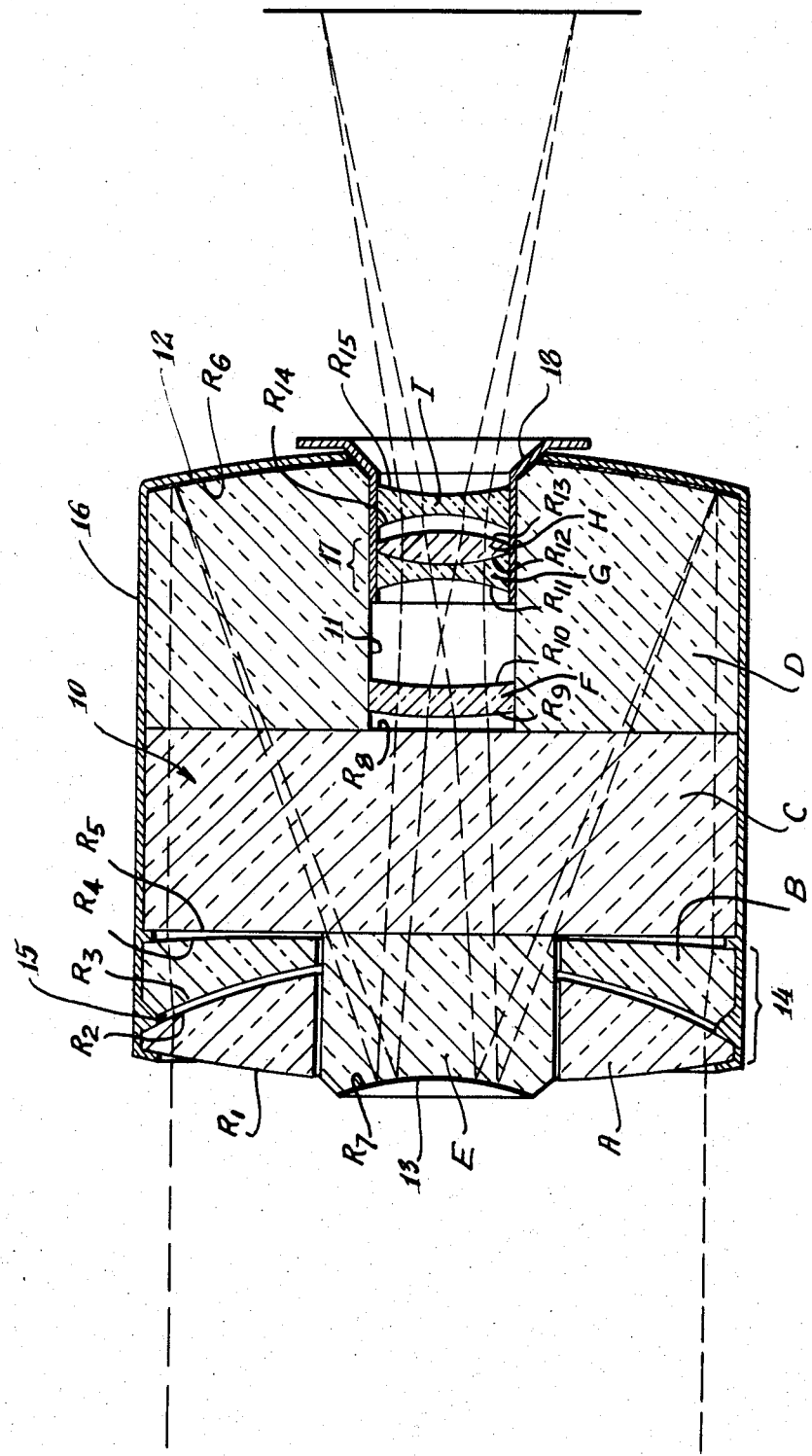

COMPACT CATADIOPTRIC APOCHROMAT SYSTEM

BACKGROUND OF THE INVENTION

The present invention relates to optical systems suited for photographic objectives and particularly to a long focal length compact, highly corrected catadioptric system which has a large telephoto ratio and in which apochromatism is achieved entirely with rather shallow spherical surfaces which avoid zonal spherical aberration, and hence, the need for aspheric surfaces to correct for spherical aberration.

Catadioptric systems constructed and sufficiently corrected for effective use as long focal length photographic objectives are known, as illustrated by U.S. Pat. No. 3,547,525. However, there are severe non-linearities inherent in catadioptric systems, and as a consequence, the focal lengths of previously known catadioptric systems are rather limited and the necessary corrections are generally achieved with the inclusion of at least one aspheric surface.

SUMMARY OF INVENTION

In accordance with the present invention there is provided a substantially solid catadioptric system that is particularly suited for a photographic objective — though not necessarily limited to such use— that provides a larger focal length and much larger telephoto ratio than provided by previously known catadioptric systems of this type, and that achieves a high degree of correction and apochromatism with simpler surfaces than heretofore provided in such systems.

In a system embodying this invention internal reflecting surfaces are provided on opposite ends of a solid refractive support which has a portion of smaller diameter projecting from its forward end with an afocal doublet at the front of the system, around the forward projection which projects through an axial aperture in the doublet. An annular convergent reflecting surface on the rear of the refractive support receives light entering the system through the afocal doublet and reflects the light to a circular divergent reflecting surface on the front end of the forwardly projecting portion of the support. The converging light from the divergent reflecting surface is reflected back through the refractive support into a central aperture which extends in from the back of the support through the opening at the center of the annular reflecting surface. A series of suitably are suitable mounted in this central aperture for providing additional corrections and for providing means to change the focus of the system.

In accordance with the invention apochromatism is achieved by making both the positive lens of the front afocal doublet and the refractive support of the same material whose refractive index differs by a relatively large amount, on the order of 17 percent, from the refractive index of the material from which the negative lens of the doublet is made, but whose dispersive power (V number) is substantially the same as the material of this negative lens, i.e., differing by less than 1 percent. Consequently, this apochromatism is achieved entirely with rather shallow (long radius) spherical surfaces which avoid the introduction of zonal spherical aberration, and hence the necessity for aspheric surfaces.

A photographic objective constructed in accordance with a preferred form of the invention provides 1400 MM focal length system with a large telephoto ratio. It has an aspect ratio of substantially one, i.e., the barrell diameter is about the same as the barrell length which is the distance between the primary and secondary reflecting surface at the opposite ends of the refractive support. It has an equivalent focal length about 18 times as long as the barrell length, excellent baffling from unwanted light, and superior image quality within the entire field of view and over the whole spectrum of visible light. The central obstruction of this objective is less than 50 percent, and seven-tenths of the field diagonal is free from vignetting. For use, these characteristics particularly suit this objective particularly to be mounted on a commercial single lens reflex 35 mm still camera, for example.

DESCRIPTION OF THE DRAWING

The invention is described in detail below with reference to the accompanying drawing which is an optical diagram of an illustrative embodiment of the invention.

DETAILED DESCRIPTION OF THE INVENTION

A catadioptric system embodying this invention as illustrated in the drawing includes a solid refractive support element 10 consisting of a body portion made up of two parts C and D and a projecting part E, which is of smaller diameter than the body portion CD, projecting forward from the front end (i.e., the left end in the drawing) of the body portion. The parts C, D and E making up the support element 10 are all of the same refractive material and are cemented together to provide a unitary, solid support element; they are fabricated separately since this is a most suitable manner of forming spherical surfaces on the several axially aligned surfaces of the support element in accordance with the requirements of the system. An axial aperture 11 extends in from the rear of the support element and has a substantially flat inner end wall (i.e., its radius R8 equals infinity) which is most easily provided by forming the aperture 11 completely through the part D so that its inner end wall is formed by the rearward end surface of part C.

A pair of internal reflecting mirrors 12 and 13 are provided in axial alignment on the rear and front ends of the support element 10. Mirror 12, which is the primary mirror of the system, is an annular convergent mirror of radius R6 formed on the rear of part D; a central opening through the annular mirror 12 is defined by the axial aperture 11. Mirror 13, which is the secondary mirror, is a circular divergent mirror of radius R7 formed on the front end of the forwardly projecting part E.

At the front of the system an afocal doublet 14, consisting of a positive lens A in front of a negative lens B with an air space 15 between is mounted on the part E of the support element 10. The part E extends through axial holes through the lenses A and B which are suitably cemented onto the part E. The circumference of the part E is suitably blackened or otherwise coated prior to mounting the doublet 14 thereon to baffle unwanted light. A cylindrical housing 16 is suitably placed around the sides of the support element 10 and doublet 14 to protect and further rigidify the system.

In order to achieve apochromatism in the system, in accordance with the invention, the positive lens A and the support element 10 are both made of the same refractive material, which has substantially the same dispersive power (V number) as the refractive material from which the negative lens B is made, but whose index of refraction differs substantially from the index of refraction of the negative lens material. Specifically, the dispersive powers of the two materials should be less than 1 percent, and preferably not more than about 0.8 percent while the difference between the index of refraction of the material of the support element and positive lens is on the order of about 17 percent. In the preferred form shown, the index of refraction of the material of the positive lens and of the support element is about 17 percent lower than the index of refraction of the negative lens material.

The positive lens and the support element are suitably made of an extra light flint glass having an index of refraction of about 1.541 and a dispersion (V number) of about 47.2 while the negative lens is suitably made of a dense lanthanum flint glass having an index of refraction of about 1.803 and a dispersion of about 46.8. The indices of refraction given herein are with reference to a wavelength of 5893A for the sodium D line in the conventional manner.

With the foregoing relationship of the indices of refraction and dispersion, apochromat correction, i.e., freedom from secondary color and spherochromatism, is provided for the system with spherical surfaces of rather shallow curvature. Thus the introduction of zonal spherical aberration, and hence the need for aspheric surfaces to correct for it, are avoided, and the system can be constructed with spherical surfaces for all the curved surfaces required.

The radii R1 through R7 of the respective surfaces of the lenses A and B and parts D and E of the support element 10, and the relative diameters of these lenses and parts are such that light entering the system through the afocal doublet 14 passes back through the parts C and D of the support element to the annular primary mirror 12 which reflects the light forward through the parts DC and E to the circular secondary mirror 13 which then reflects the light back through the parts E and C into the axial aperture 11 which defines the opening through the center of the annular primary mirror 12.

A negative lens F, a cemented doublet 17 consisting of a negative lens G and a positive lens H, and another negative lens I are mounted in this order in axial alignment in the axial aperture 11 to receive light reflected from the secondary mirror 13 and serve to correct for field aberrations and to increase the focal length of the system.

As shown, the negative lens F is suitably fixed in the aperture 11, the doublet 17 and the rearward negative lens I are mounted in a generally tubular support 18 which is movable axially relatively to the preceding components for changing and adjusting the focus of the system.

A table I listing the relative values for a specific example of a catadioptric system constructed in accordance with this invention follows. As customary in the art, the absence of a sign in front of numerical values indicates plus value and signifies that a surface is convex to object (i.e., to the left in the drawing) and that a distance is measured from left to right, a minus sign signifies that a surface is concave to the object and that a distance is measured from right to left.

TABLE I

Focal length 1400 MM (54.9949 inches)
Relative Aperture f/20
Field of View 1.9°
Overall Length 3 inches
Front Vertex Distance 5.10 inches
Image Distance 2.31 inches

| Element | radius | thickness | spacing | Axial Distance From entrance | Index of refraction* | dispersion (V no.) |
|---|---|---|---|---|---|---|
| A | R1 14.627 | 0.5000 | | 0.000 | 1.541 | 47.2 |
| | R2 −3.4096 | | | 0.500 | | |
| | | | 0.050 | | | |
| B | R3 −3.3873 | 0.1000 | | 0.550 | 1.803 | 46.8 |
| | R4 −21.9712 | | | 0.650 | | |
| | | | 0.000 | | | |
| C−D | R5 433.5875 | 2.3000 | | 0.650 | 1.541 | 47.2 |
| | R6 −7.3398 | | | 2.950 | | |
| | | | −1.000 | | | |
| E−C | R7 −1.6553 | 1.7000 | | −0.50 | 1.541 | 47.2 |
| | R8 ∞ | | | 1.650 | | |
| | | | 0.073 | | | |
| F | R9 6.7448 | 1.1500 | | 1.723 | 1.621 | 35.9 |
| | R10 3.2451 | | | 1.873 | | |
| | | | 0.540 | | | |
| G | R11 −1.2586 | 0.0500 | | 2.413 | 1.623 | 56.9 |
| | R12 1.2031 | | | 2.463 | | |
| | | | 0 | | | |
| H | R12 1.2031 | 0.1500 | | 2.463 | 1.621 | 35.9 |
| | R13 −0.9731 | | | 2.613 | | |
| | | | 0.0805 | | | |
| I | R14 −0.7994 | 0.1000 | | 2.694 | 1.623 | 56.9 |
| | R15 1.5130 | | | 2.794 | | |

*Sodium D line, 5893Å

L6 Sodium D line, 5893A

What is claimed is:

1. A compact catadioptric system for use as a long focal length photographic objective comprising in axial alignment:

a solid refractive support element consisting of a body portion and a portion of smaller diameter projecting forward from the front end of the body portion, a pair of spherical internal reflecting surfaces on opposite ends of the support element consisting of an annular convergent reflecting surface on the rear end of the support element having an opening therethrough and a circular divergent reflecting surface on the forward end of the forwardly projecting portion of the support element to receive light from the convergent reflecting surface and reflect said light through the opening in the annular reflecting surface, and means producing apochromatism of the system comprising a front afocal doublet consisting of a positive lens in front of a negative lens,
said positive and negative lenses each having an axial aperture therethrough and being positioned in front of the body portion of the support element with the forwardly projecting portion of the support element extending through the latter apertures,
said positive lens and said support element being of the same material whose index of refraction differs by a substantial amount from the index of refraction of the material of the negative lens, and
the material of the negative lens having substantially the same dispersive power as the material of the positive lens and support element.

2. The system of claim 1 in which the index of refraction of the material of the positive lens and support element differs substantially from the index of refraction of the material of the negative lens.

3. The system of claim 1 in which the index of refraction of the material of the positive lens and support element is on the order of about 17 percent less than the index of refraction of the material of the negative lens, and in which the difference between the dispersion of the material of the positive lens and support elements and the dispersion of the material of the negative lens is less than 1 percent.

4. The system of claim 3 in which the positive and negative lenses of said afocal doublet are spaced apart with an air space between.

5. The system of claim 1 in which the said body portion has a central aperture extending in from the rear and which includes lens means in the latter aperture for increasing the focal length of the system and correcting aberrations.

6. The system of claim 5 in which said lens means comprise in axial alignment from front to rear, a second negative lens, a cemented doublet and a third negative lens.

7. The system of claim 6 in which said cemented doublet and said third negative lens are mounted in an axially movable support for changing the focus of the system.

8. A compact catadioptric system for use as a long focal length photographic objective comprising in axial alignment:
   a solid refractive support element (CDE) consisting of a body portion (CD) and a portion (E) of smaller diameter projecting forward from the front end of the body portion, said body portion having a central aperture extending in from the rear,
   a pair of spherical internal reflecting surfaces on opposite ends of the support element consisting of an annular convergent reflecting surface on the rear end of the support element around said aperture and a circular divergent reflecting surface on the forward end of the forwardly projecting portion of the support element to receive light from the convergent reflecting surface and reflect said light into said central aperture, and
   means producing apochromatism of the system comprising a front afocal doublet consisting of a positive lens in front of a negative lens, said positive and negative lenses each having an axial aperture therethrough and being positioned in front of the body portion of the support element with the forwardly projecting portion of the support element extending through the latter aperture, and
   said system being characterized by the following constructional data:

Focal Length 1400 MM (54.9949 inches)
Relative Aperture f/20
Field of View 1.9°
Overall Length 3 inches
Front Vertex Distance 5.10 inches
Image Distance 2.31 inches

| Element | radius | thickness | spacing | Axial distance from entrance | Index of refraction | dispersion (V no.) |
|---|---|---|---|---|---|---|
| A | R1 14.6874 | 0.5000 | | 0.000 | 1.541 | 47.2 |
|   | R2 −3.4096 | | | 0.500 | | |
|   | | | 0.050 | | | |
| B | R3 −3.3873 | 0.1000 | | 0.550 | 1.803 | 46.8 |
|   | R4 −21.9712 | | | 0.650 | | |
|   | | | 0.000 | | | |
| C–D | R5 433.5875 | 2.3000 | | 0.650 | 1.541 | 47.2 |
|   | R6 −7.3398 | | | 2.950 | | |
|   | | | −1.000 | | | |
| E–C | R7 −1.6553 | 1.7000 | | −0.050 | 1.541 | 47.2 |
|   | R8 ∞ | | | 1.650 | | |

9. The system of claim 8 including lens means mounted in the central aperture that extends in from the rear of said support element for increasing the focal length of the system and correcting aberrations.

10. The system of claim 9 in which said lens means comprise in axial alignment from front to rear, a second negative lens (F), a cemented doublet (GH), and a third negative lens (I) characterized by the following constructional data:

| Element | radius | thickness | spacing | axial distance from entrance | index of refraction | dispersion (V no.) |
|---|---|---|---|---|---|---|
|   | | | C–F 0.073 | | | |
| F | R9 6.7448 | 1.1500 | | 1.723 | 1.621 | 35.9 |
|   | R10 3.2451 | | | 1.873 | | |
|   | | | 0.540 | | | |
| G | R11 −1.2586 | 0.0500 | | 2.413 | 1.623 | 56.9 |
|   | R12 12 1.2031 | | | 2.463 | | |
|   | | | 0 | | | |
| H | R12 1.2031 | 0.1500 | | 2.463 | 1.621 | 35.9 |
|   | R13 −0.9731 | | | 2.613 | | |
|   | | | 0.0805 | | | |
| I | R14 −0.7994 | 0.1000 | | 2.694 | 1.623 | 56.9 |
|   | R15 15 1.5730 | | | 2.794 | | |

* * * * *